(12) United States Patent
Montague

(10) Patent No.: US 6,425,565 B1
(45) Date of Patent: Jul. 30, 2002

(54) METHOD AND APPARATUS FOR THE USE OF SUCTION CUPS ON DELICATE SURFACES

(75) Inventor: Roland Wescott Montague, Vancouver (CA)

(73) Assignee: Creo SRL, Holetown (BB)

( * ) Notice: Subject to any disclaimer, the term of this patent is extended or adjusted under 35 U.S.C. 154(b) by 0 days.

(21) Appl. No.: 09/440,662

(22) Filed: Nov. 16, 1999

(51) Int. Cl.$^7$ ............................ A45D 42/14; F16B 47/00
(52) U.S. Cl. ................. 248/363; 248/205.9; 248/206.2; 294/64.1
(58) Field of Search .............................. 248/683, 205.5, 248/205.6, 205.7, 205.8, 205.9, 206.1, 363, 362, 206.3, 206.4, 206.2; 294/65, 64.1; 271/91, 103; 414/627

(56) References Cited

U.S. PATENT DOCUMENTS

| | | | | |
|---|---|---|---|---|
| 3,571,839 A | * | 3/1971 | Hartmann | 294/64.1 |
| 3,627,369 A | * | 12/1971 | Nixon | 294/64.1 |
| 3,910,620 A | * | 10/1975 | Sperry | 294/64.1 |
| 4,667,948 A | | 5/1987 | Angelbeck et al. | 271/98 |
| 4,878,799 A | | 11/1989 | Seto et al. | 414/331 |
| 5,992,324 A | | 11/1999 | Rombult et al. | 101/477 |
| 6,000,337 A | | 12/1999 | Blake et al. | 101/477 |

FOREIGN PATENT DOCUMENTS

| | | |
|---|---|---|
| DE | 4038544 | 6/1992 |
| DE | 4105269 | 9/1992 |

OTHER PUBLICATIONS

Seybold Report on Publishing Systems vol. 24, No. 20 (Jun. 26, 1995).
Barco Lithosetter Brochure, (May 1995).
Adams et al., Computer–to–Plate: Automating the Printing Industry pp. 143–150 (1996).
Llmburg, Essentials of Computer–to–Plate Technology, pp. 48–49 (1995).
ICG Titan 582 Brochure, May 1995.
Adams et al.,Computer–to–Plate: Automating the Printing Industry pp. 159–170 (1996).
Adams et al., Computer–to–Plate: Automating the Printing Industry pp. 177–182 (1996).
Adams et al., Computer–to–Plate: Automating the Printing Industry pp. 135–143 (1996).

* cited by examiner

Primary Examiner—Anita King
Assistant Examiner—Gwendolyn Baxter
(74) Attorney, Agent, or Firm—Oyen Wiggs Green & Mutala

(57) ABSTRACT

A suction cup system facilitates the holding and manipulation of sensitive objects such as printing plates without scratching, marring or damaging surfaces of the objects. The system has a flexible thin sheet made of polyester or similar material. The flexible sheet is stretched over the flexible contact flange of a suction cup and supported in position by a relatively rigid frame. The flexible sheet contains at least one aperture communicating with the interior of the suction cup. The apparatus is brought into the vicinity of the object, with the exterior surface of the flexible sheet in contact with the object. A vacuum line acts to create suction force between the suction cup and the object via the aperture. As the vacuum increases, the flexible contact flange flattens and slides across the interior surface of the flexible sheet rather than the sensitive surface of the object. The movement of the flexible suction cup's flexible contact flange does not scratch, mar or damage the object.

22 Claims, 4 Drawing Sheets

METHOD AND APPARATUS FOR THE USE OF SUCTION CUPS ON DELICATE SURFACES

FIELD OF THE INVENTION

The invention relates to the use of suction cups as a means of holding and manipulating objects. Specifically, the invention is related to a method and apparatus for the use of suction cups on materials with a sensitive surface, such as printing plates.

BACKGROUND OF THE INVENTION

The use of suction cups as a means of holding and manipulating objects is well known. The basic operation of the suction cup is depicted in FIGS. 1-a and 1-b, which depict a cross section of a suction cup 10. The suction cup 10 is used to hold and manipulate an object 15. FIG. 1-a depicts the parts of the suction cup 10, which typically comprise a flexible contact flange 11 (made out of a soft material such as rubber, which is impermeable to air) and a more rigid structural member 12. The suction cup 10 may generally be of any shape. Typical suction cups are round. The suction cup 10 also normally includes a vacuum hose 13, which is in fluid communication with a pump (not shown).

FIG. 1-a shows the suction cup 10 as it is brought into contact with the object 15 to be manipulated. At this stage, the pump is not activated (i.e. there is no vacuum in the vacuum line 13); consequently, the suction cup 10 is in an inactive mode. FIG. 1-b shows the suction cup 10 when the vacuum pump is activated. When the air is pumped out of the cup's interior region 14, the reduced pressure inside the interior region 14 draws the suction cup 10 closer to the object 15, causing the object 15 to be held in position at the bottom of the suction cup 10.

A drawback of using suction cups occurs when the object to be manipulated is sensitive to scratching. Referring to FIG. 1-b, when the pressure is reduced in the interior region 14 and the suction cup 10 is drawn closer to the object 15, the flexible contact flanges 11 spread in a radial direction and translate across the surface of the object 15. This translation of the flexible contact flange 11 can scratch, mar or otherwise damage the surface of the object 15.

Despite the scraping action of the flexible contact flanges 11, they are a useful element of the suction cup 10. The flexible contact flanges 11 in combination with the negative pressure created in the cavity 14 by the vacuum hose 13 permit the suction cup 10 to be used on objects 15, which may have uneven surfaces. That is, the flexible contact flanges 11 can bend by variable amounts to accommodate imperfections and deviations in the surface of the object 15.

For some applications of suction cups, this scraping action is not a problem. Such applications include those where the object 15 is a hard object (i.e. relative to the flexible material used in the contact flanges 11) or where the subsequent use of the object 15 is not significantly affected by minor scratching of the object's surface. However, other applications where this scraping action could be a problem include those where the object is highly sensitive or where the subsequent use of the object requires perfectly homogeneous surfaces (i.e. where a relatively small scratch could corrupt the entire process for which the object is to be used).

It is an object of the present invention to provide an apparatus for a suction cup system, which facilitates the holding and manipulation of a sensitive object without scratching, marring or damaging the surface of the object.

It is a further object of the invention to provide a method of holding and manipulating sensitive objects using suction cups, but without scratching, marring or damaging the surface of the object.

It is a further object of this invention to provide a method and apparatus for the holding anf manipulation of printing plates, which are coated with a layer of sensitive imaging materials. In particular, the method and apparatus should facilitate the holding and manipulation of the printing plate without scratching, marring or damaging the sensitive imaging surface or the plate itself.

SUMMARY OF THE INVENTION

In accordance with the present invention, an apparatus designed to hold an object is disclosed. The apparatus comprises a suction cup, with several parts, including: a vacuum hose, an interior region and a flexible contact flange. The vacuum hose is operative to reduce pressure and create a suction force in the interior region of the suction cup. The apparatus also comprises a frame located in the vicinity of the suction cup and a flexible sheet. The flexible sheet is attached to the frame between the suction cup and the object and has at least one aperture, which is aligned with the interior region of the suction cup.

The flexible sheet provides a conformal barrier, which prevents direct physical contact between the flexible contact flange and the object, but which permits suction force to act on the object via the aperture, thereby allowing the object to be held, without scratching, marring or damaging its surface.

Preferably, the apparatus may also include a movement system, which manipulates the object, once held, by manipulating either the suction cup or the frame.

Advantageously, the flexible sheet may have an interior surface, which is in physical contact with the flexible contact flange, such that the flexible sheet sustains any relative motion of the flexible contact flange against its interior surface, without transmitting the relative motion to the object. Additionally, the flexible sheet may sustain any contact with the object against its exterior surface. Preferably, the flexible sheet may be made out of polyester.

Advantageously, the frame may be physically attached to the suction cup.

In a particular embodiment of the invention, the object may be a printing plate, having sensitive imaging materials on one side thereof.

In another aspect of the invention, the apparatus comprises a plurality of suction cups, each suction cup having its own frame and flexible sheet as described above. In this manner, a heavier object may be held and may be manipulated, because of the increased suction force of the plurality of suction cups.

In another aspect of this invention, the apparatus comprises a plurality of suction cups, but there is only one frame and one flexible sheet for the entire plurality of suction cups. Once again, this aspect of the invention facilitates the holding and manipulation of a heavier object, because of the increased suction force of the plurality of suction cups.

Another aspect of this invention involves a method of using a suction cup to hold an object. The method comprises the steps of:

(a) moving the suction cup into the vicinity of the object, such that a flexible contact flange of the suction cup is in close proximity to, but not in physical contact with, the object;

(b) introducing a perforated flexible sheet between the object and the flexible contact flange; and (c) reducing pressure in the interior region of the suction cup, so as to create a suction force on the object via the perforations in the flexible sheet.

The method requires that the perforations in the flexible sheet be located such that there is at least one aperture aligned with the interior region of the suction cup. When the suction force is applied, it causes the object to move toward, and to be held in contact with, the exterior surface of the flexible sheet. In addition, the suction force causes the flexible contact flange to compress in a manner whereby the flexible contact flange translates along the interior surface of the flexible sheet without physically contacting, scratching, marring or damaging the object.

Advantageously, the method of holding the object may also comprise an additional step of manipulating the object by manipulating the suction cup. The method is independent of what order the introducing step (b) and the moving step (a) are completed.

Preferably, the method may be accomplished using a relatively rigid frame, which supports the flexible sheet. If there is a frame, then it may be advantageous to have the frame attached to the suction cup, because the object may then be manipulated by manipulating the frame.

The flexible sheet may be made of polyester and the object may a printing plate, having sensitive imaging materials on one side thereof.

Another aspect of the invention involves a method of using a plurality of suction cups to hold an object, where each suction cup has its own frame and flexible sheet as described above. In this manner, a heavier object may be held and may be manipulated, because of the increased suction force of the plurality of suction cups.

Another aspect of the invention involves a method of using a plurality of suction cups to hold an object, but where there is only one frame and one flexible sheet for the entire plurality of suction cups. Once again, this aspect of the invention facilitates the holding and manipulation of a heavier object, because of the increased suction force of the plurality of suction cups.

DESCRIPTION OF THE PREFERRED EMBODIMENT

Figure 2:
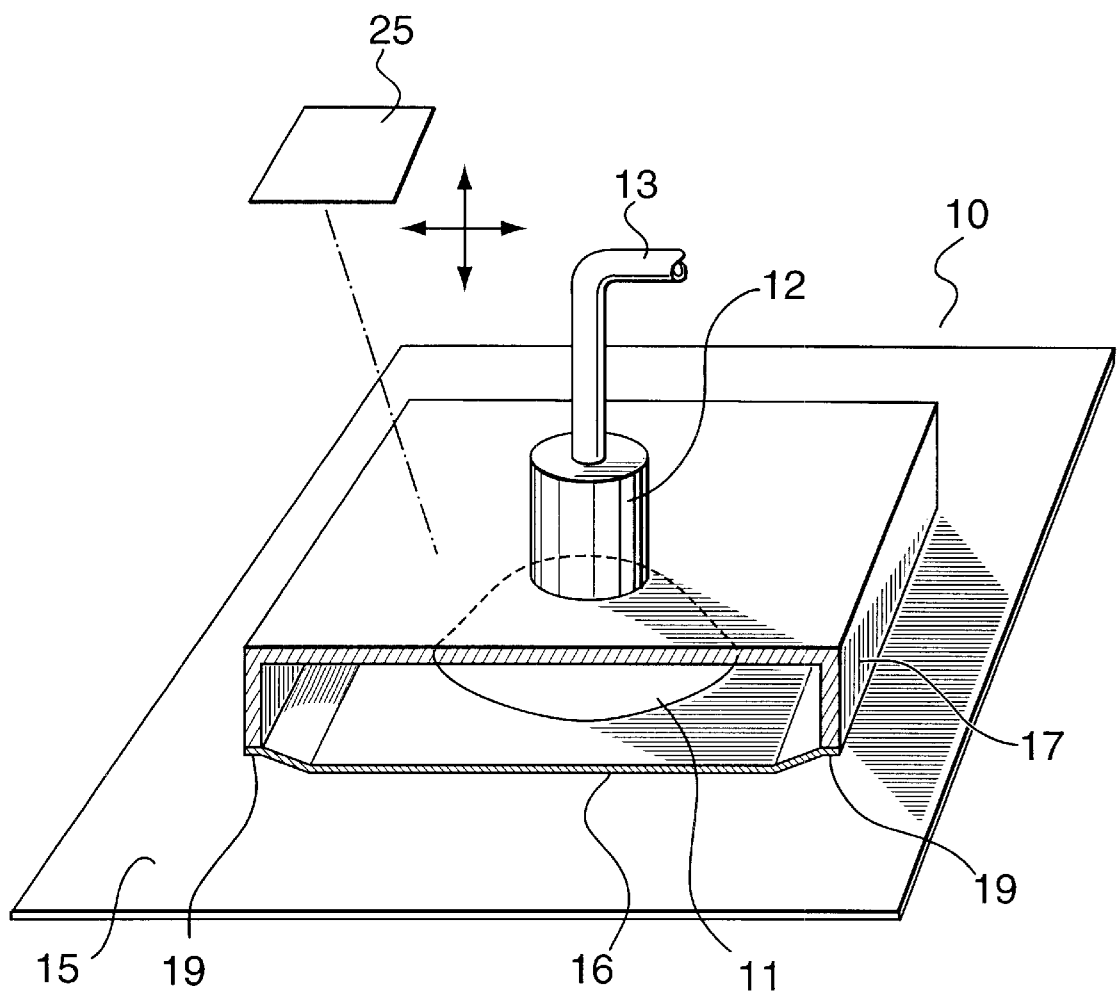
FIG. 2 depicts an embodiment of the present invention being used to manipulate a printing plate.

An embodiment of the apparatus of present invention is depicted in FIG. 2. The apparatus comprises a suction cup 10, which is made up of the standard suction cup parts including a flexible contact flange 11, the body of the cup 12, a vacuum hose 13 and a pump (not shown). Attached to the body 12 of the suction cup 10 is a relatively rigid frame 17. The frame 17 holds a flexible sheet 16 of a polyester like material, which is stretched between the distal ends 19 of the frame 17 and is in contact with the active end of the flexible contact flange 11 of the suction cup 10. The flexible sheet 16 is also perforated with at least one aperture (not shown in FIG. 2). The aperture is aligned with the interior of the suction cup 10. In general, the flexible sheet 16 may be made of any number of materials and the invention should be understood to be independent of the material used in the flexible sheet 16. Preferably, however, the sheet 16 is made out of a material that is thin, lightweight, hard and flexible. A thin metal foil can be used instead of a polymeric sheet.

The apparatus is shown in an active mode, where it is holding an object 15. In FIG. 2, the object 15 being held by the apparatus is a printing plate. The printing plate has a surface 15A coated with sensitive materials. It should be understood, however, that the invention is not limited by the object. The invention has application to the holding and manipulating of any object where there is a concern with respect to scratching, marring or damaging the object.

Figure 3A:
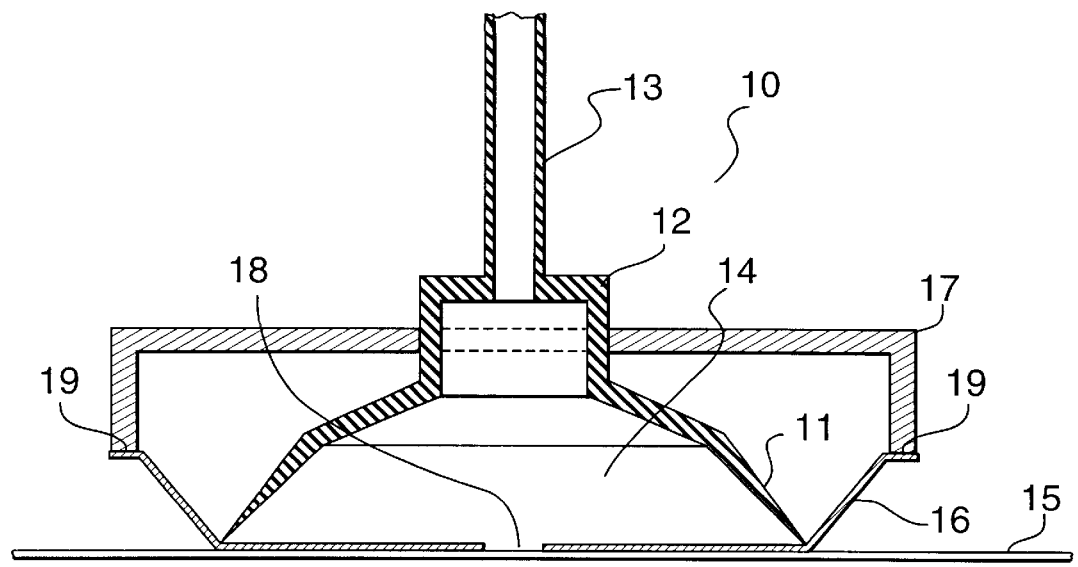
FIGS. 3-*a* and 3-*b* depict the operation of the present invention, showing how the apparatus is used to hold and manipulate a printing plate without scratching, marring or damaging the sensitive imaging surface of the plate.
Figure 3B:
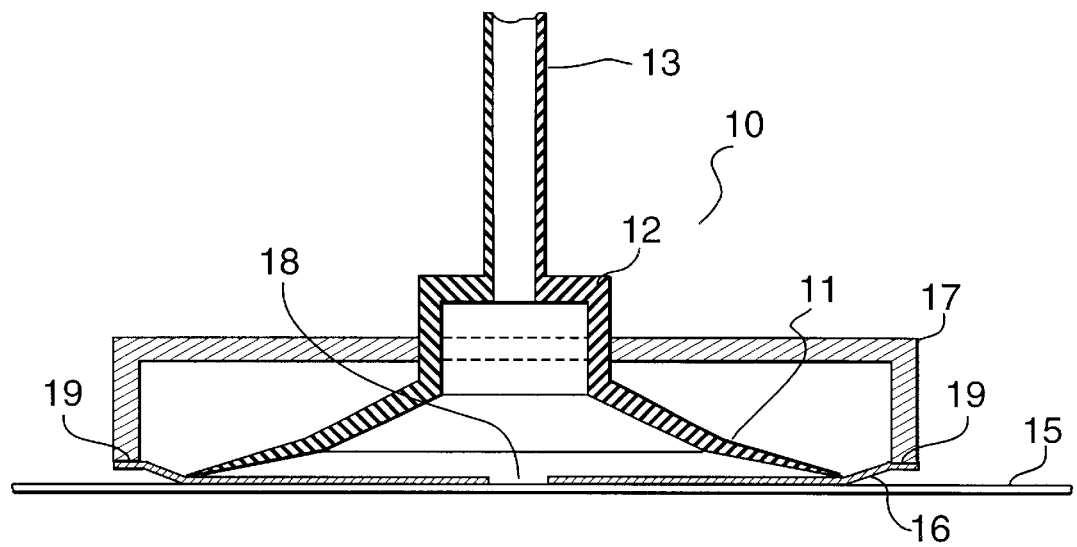

A method of holding and manipulating objects according to the invention is depicted in FIGS. 3-*a* and 3-*b*. FIG. 3-*a* depicts the invention in an inactive mode. The flexible sheet 16 is shown stretched across the distal ends 19 of the frame 17. It can be seen the interior surface of the flexible sheet 16 is in contact with the active ends of the flexible contact flange 11. Also depicted in FIG. 3-*a* is the aperture 18 in the flexible sheet 16, which communicates with the interior region 14 of the suction cup 10. The apparatus is brought into the vicinity of the object 15, such that the exterior surface of the flexible sheet 16 is close to (or contacting) the surface of the object 15. In FIG. 3-*a*, no vacuum has been applied, and the object 15 is not yet being held or manipulated by the apparatus.

Figure 1A:
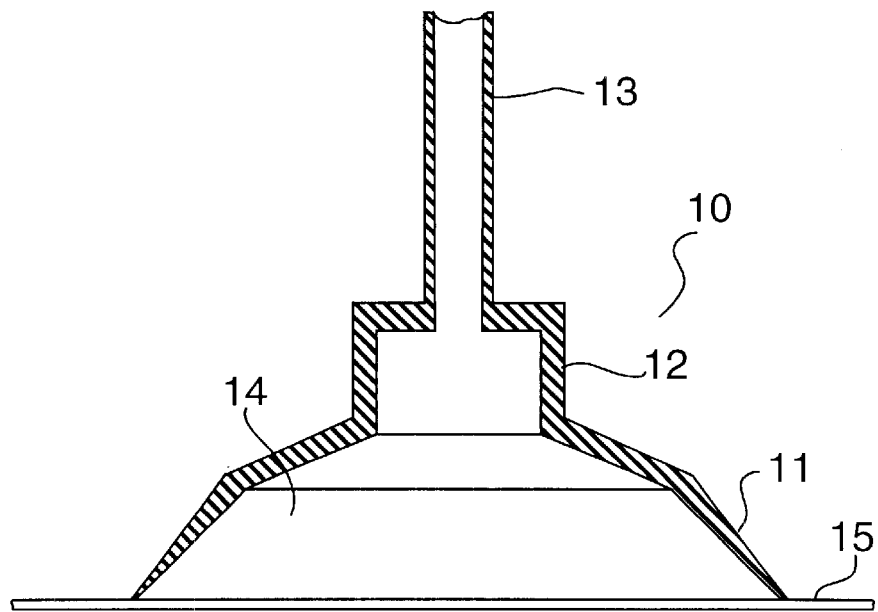
FIGS. 1-*a* and 1-*b* depict the operational principle behind a conventional suction cup system, displaying the method and apparatus for holding and manipulating an object.
Figure 1B:
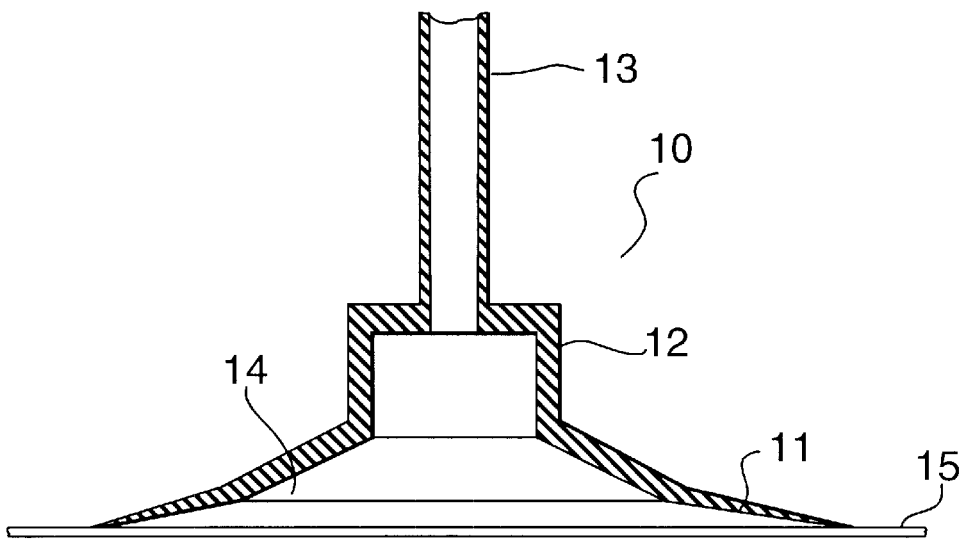

In FIG. 3-*b*, a pump (not shown) is used to reduce the pressure in the interior region 14 of the suction cup 10 via vacuum hose 13. The reduction in pressure creates a suction force on the object 15 via the aperture 18 in the flexible sheet 16, and the object 15 is pulled toward the apparatus. As the object 15 is pulled toward the apparatus, the flexible contact flange 11 is caused to spread outward; however, as opposed to scraping along the surface of the object 15 (as was the case in the prior art suction cup of FIGS. 1-*a* and 1-*b*), the flexible contact flange 11 translates outward against the interior surface of the flexible sheet 16. In this manner, the invention eliminates the direct contact between the flexible contact flange 11 and the object 15 and prevents scratching, marring or damaging of the object 15. At some point, the suction force communicated to the object 15 is counteracted by the resistive force of the flexible contact flange 11 and the weight of the object 15. At this point, the object 15 reaches an equilibrium state, where it is firmly held by the apparatus and may be easily manipulated by simply moving the apparatus itself. Generally, the apparatus may be moved by any means, including such techniques as mechanical, electrical, robotic, magnetic and by hand. FIG. 2 illustrates schematically a movement system 25 which is coupled to suction cup 10 and is capable of moving suction cup 10.

Figure 4:
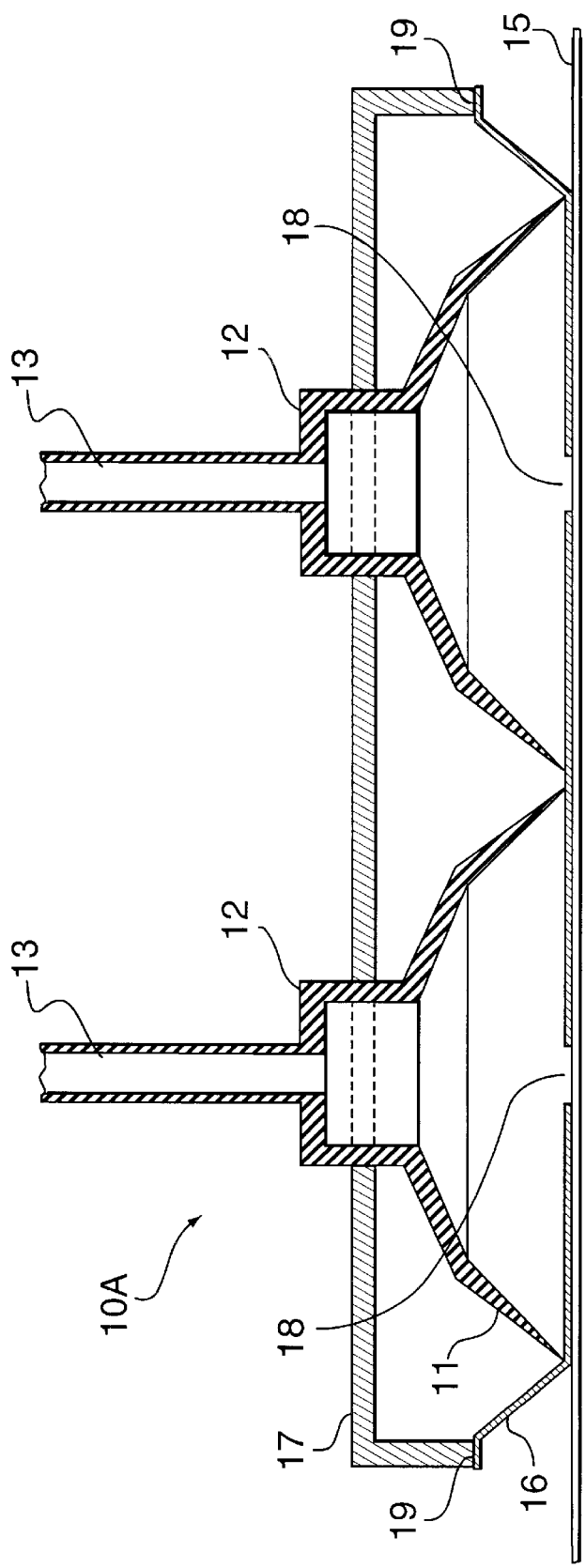
FIG. 4 illustrates an embodiment of the invention having a plurality of suction cups and one flexible sheet.

An apparatus and method such as the one described above and depicted in FIG. 3 may involve the use of a plurality of suction cups as shown in FIG. 4. In addition, each suction cup may have its own individual frame and flexible sheet or alternatively, as in the embodiment 10A of FIG. 4, one frame and one flexible sheet may be used for all of the suction cups. The number of suction cups required is dependent on the mass of the object to be held and manipulated and the amount of suction that may be generated by each suction cup.

The important aspects of the functionality of the frame 17 and the flexible sheet 16 lie in their alignment with the suction cup 10 and not in the manner in which the frame 17 is connected to the suction cup 10. As such, the invention should be considered independent of whether or not the frame 17 is connected to the cup 10. The invention should be considered sufficiently broad to accommodate various apparatuses used to align the frame 17 and the flexible sheet 16 with the suction cup 10, whether they involve direction attachment of the frame 17 to the suction cup 10 or they use some other means of supporting the frame 17 and the flexible sheet 16.

It should be understood that the above description is intended for illustrative purposes only, and is not intended to limit the scope of the present invention in any way. Those skilled in the art will appreciate that various modifications can be made to the embodiments discussed above without departing from the spirit of the present invention.

What is claimed is:

1. An apparatus for holding an object, the apparatus comprising:
    (a) a suction cup comprising a vacuum line, an interior region and a flexible contact flange, the vacuum line operative to reduce pressure in the interior region of the suction cup;
    (b) a rigid frame located in a vicinity of the suction cup; and
    (c) a flexible sheet, attached to the frame at locations outward from a rim of the contact flange, the sheet extending across the suction cup and having at least one aperture which communicates with the interior region of the suction cup
    the sheet operative to provide a barrier which prevents direct physical contact between the flexible contact flange and an object, but which permits a suction force resulting from the reduced pressure in the interior region of the suction cup to act on a surface of an object via the aperture, thereby allowing the object to be held without scratching, marring or damaging the surface of the object.

2. An apparatus according to claim 1, which further comprises a movement system, which is operative to manipulate an object being held, by manipulating one of the suction cup and the frame.

3. An apparatus according to claim 1, wherein the flexible sheet has an interior surface in physical contact with the flexible contact flange, such that the flexible sheet sustains any relative motion of the flexible contact flange against the interior surface of the flexible sheet without transmitting such relative motion to an object being held.

4. An apparatus according to claim 1, wherein the flexible sheet is made of polyester.

5. An apparatus according to claim 1, wherein the frame is attached to the suction cup.

6. An apparatus according to claim 1 in combination with an object being held, wherein the object is a printing plate, having physically fragile imaging materials on one side thereof.

7. The apparatus of claim 1, wherein an inner surface of the flexible sheet in contact with the open end of the suction cup is smooth.

8. An apparatus for holding an object, the apparatus comprising:
    (a) a plurality of suction cups, each of which comprises a vacuum line, an interior region and a flexible contact flange, each of said vacuum lines being operative to reduce pressure and create a suction force in the interior region of a corresponding one of the suction cups;
    (b) a plurality of rigid frames, each frame being located in a vicinity of, and corresponding to, one of the suction cups; and,
    (c) a plurality of flexible sheets, each flexible sheet being attached to one of the frames at locations outward from a rim of the corresponding contact flange, the sheet extending across the corresponding suction cup,
    each flexible sheet having at least one aperture which communicates with the interior region of the corresponding suction cup, each flexible sheet operative to provide a barrier which prevents direct physical contact between the flexible contact flange of the corresponding suction cup and an object, but which permits the suction force to act on a surface of an object via each aperture, thereby allowing the object to be held without scratching, marring or damaging the surface of the object.

9. An apparatus according to claim 8, comprising a movement system, which is operative to manipulate said object, once held, by manipulating at least one of said suction cups and said frames.

10. An apparatus for holding an object, the apparatus comprising:
    (a) a plurality of suction cups, each of which comprises a vacuum line, an interior region and a flexible contact flange, each one of the vacuum lines being operative to reduce pressure and create a suction force in the interior region of a corresponding one of the suction cups;
    (b) a rigid frame located in a vicinity of the plurality of suction cups; and,
    (c) a flexible sheet attached to the frame at locations outward from the plurality of contact flanges, the sheet extending across the plurality of suction cups and having a plurality of apertures, at least one of which communicates with the interior region of each suction cup,
    the sheet operative to provide a barrier which prevents direct physical contact between the flexible contact flanges of the plurality of suction cups and an object, but which permits the suction force to act on a surface of an object via each of the apertures, thereby allowing the object to be held without scratching, marring or damaging the surface of the object.

11. An apparatus according to claim 10, which further comprises a movement system, which is operative to manipulate the object, once held, by manipulating at least one of the suction cups and the frame.

12. A method of using a suction cup comprising a flexible contact flange, to hold an object, the method comprising:
    (a) moving the suction cup into a vicinity of the object, such that the flexible contact flange of the suction cup is in close proximity to, but not in physical contact with, the object and providing a flexible sheet between the object and the flexible contact flange of the suction cup, the flexible sheet having at least one aperture which communicates with an interior region of the suction cup; and,
    (b) reducing pressure in the interior region of the suction cup, so as to create a suction force on the object via the aperture in the flexible sheet, while holding edges of the flexible sheet at locations outward of the flexible contact flange
    the suction force causing the object to move toward, and to be held in contact with, an exterior surface of the flexible sheet, and causing the flexible contact flange to compress m a manner whereby the flexible contact flange translates along an interior surface of the flexible sheet without directly contacting the object.

13. A method according to claim 12, which further comprises the step of manipulating the object by manipulating the suction cup.

14. A method of using a suction cup comprising a flexible contact flange, to hold an object, the method comprising:
    (a) moving the suction cup into a vicinity of the object, such that the flexible contact flange of the suction cup is in close proximity to, but not in physical contact with, the object;
    (b) providing a flexible sheet between the object and the flexible contact flange of the suction cup,
        (i) the flexible sheet having at least one aperture which communicates with an interior region of the suction cup, and (ii) the flexible sheet being attached to a rigid frame, located in a vicinity of the suction cup, the flexible sheet being attached to the frame at locations outward from a rim of the contact flange; and, (c) reducing pressure in the interior region of the suction cup, so as to create a suction force on the object via the aperture in the flexible sheet, while holding edges of the flexible sheet at locations outward of the flexible contact flange the suction force causing the object to move toward, and to be held in contact with, an exterior surface of the flexible sheet, and causing the flexible contact flange to compress in a manner whereby the flexible contact flange translates along an interior surface of the flexible sheet without directly contacting the object.

15. A method of using a suction cup comprising a flexible contact flange, to hold an object, the method comprising:

(a) moving the suction cup into a vicinity of the object, such that the flexible contact flange of the suction cup is in close proximity to, but not in physical contact with, the object;

(b) providing a flexible sheet between the object and the flexible contact flange of the suction cup,
  (i) the flexible sheet having at least one aperture which communicates with an interior region of the suction cup,
  (ii) the flexible sheet being attached to a rigid frame, located in a vicinity of the suction cup, the flexible sheet being attached to the frame at locations outward from a rim of the contact flange, and
  (iii) the frame being attached to the suction cup; and, (c) reducing pressure in the interior region of the suction cup, so as to create a suction force on the object via the aperture in the flexible sheet, while holding edges of the flexible sheet at locations outward of the flexible contact flange the suction force causing the object to move toward, and to be held in contact with, an exterior surface of the flexible sheet, and causing the flexible contact flange to compress in a manner whereby the flexible contact flange translates along an interior surface of the flexible sheet without directly contacting the object.

16. A method of using a suction cup comprising a flexible contact flange, to hold an object, the method comprising:

(a) moving the suction cup into a vicinity of the object, such that the flexible contact flange of the suction cup is in close proximity to, but not in physical contact with, the object;

(b) providing a flexible sheet between the object and the flexible contact flange of the suction cup,
  (i) the flexible sheet having at least one aperture which communicates with an interior region of the suction cup, and
  (ii) the flexible sheet being made out of polyester; and, (c) reducing pressure in the interior region of the suction cup, so as to create a suction force on the object via the aperture in the flexible sheet, while holding edges of the flexible sheet at locations outward of the flexible contact flange the suction force causing the object to move toward, and to be held in contact with, an exterior surface of the flexible sheet, and causing the flexible contact flange to compress in a manner whereby the flexible contact flange translates along an interior surface of the flexible sheet without directly contacting the object.

17. A method of using a suction cup comprising a flexible contact flange, to hold an object, the method comprising:

(a) moving the suction cup into a vicinity of the object, such that the flexiable contact flange of the suction cup is in close proximity to, but not in physical contact with, the object, wherein the object is a printing plate, having sensitive imaging materials on one side thereof;

(b) providing a flexible sheet between the object and the flexible contact flange of the suction cup, the flexible sheet having at least one aperture which communicates with an interior region of the suction cup; and, (c) reducing pressure in the interior region of the suction cup, so as to create a suction force on the object via the aperture in the flexible sheet, while holding edges of the flexible sheet at locations outward of the flexible contact flange the suction force causing the object to move toward, and to be held in contact with, an exterior surface of the flexible sheet, and causing the flexible contact flange to compress in a manner whereby the flexible contact flange translates along an interior surface of the flexible sheet without directly contacting the object.

18. A method of using a plurality of suction cups, each comprising a flexible contact flange, to hold an object, the method comprising:

(a) moving the suction cups into a vicinity of the object, such that the flexible contact flange of each one of the suction cups is in close proximity to, but not in physical contact with, the object and providing one of a plurality of flexible sheets between the object and each of the flexible contact flanges, each flexible sheet having at least one aperture which communicates with an interior region of a corresponding one of the suction cups; and, (b) reducing pressure in the interior region of each of the suction cups, so as to create a suction force on the object via the apertures while holding edges of the flexible sheet at locations outward of the flexible contact flange of a corresponding one of the suction cups;

the suction force causing the object to move toward, and to be held in contact with, exterior surfaces of the flexible sheets, and causing the flexible contact flange of each suction cup to compress in a manner whereby each flexible contact flange translates along an interior surface of the corresponding flexible sheet without directly contacting the object.

19. A method according to claim 18, which further comprises the step of manipulating the object by manipulating either the plurality of suction cups or the frame.

20. An apparatus for holding an object, the apparatus comprising:

(a) a suction cup having an open end;

(b) a rigid member secured to the suction cup, the member comprising attachment elements positioned outwardly of the open end; and, (c) a non-elastic flexible sheet comprising a polymeric composite attached to the attachment elements, wherein the flexible sheet;
  (i) covers and is in contact with the open end of the suction cup,
  (ii) prevents direct physical contact between the open end of the suction cup and an object being held and,
  (iii) comprises an aperture positioned over the open end of the suction cup.

21. An apparatus according to claim 20, wherein the attachment elements are located behind the open end of the suction cup.

22. An apparatus according to claim 20, wherein an inner surface of the flexible sheet in contact with the open end of the suction cup is smooth.

\* \* \* \* \*